United States Patent
Marin

(10) Patent No.: US 10,793,814 B2
(45) Date of Patent: Oct. 6, 2020

(54) FERMENTER

(71) Applicant: CASTLE COMMERCIAL ENTERPRISES LIMITED, Dublin (IE)

(72) Inventor: Francesco Marin, Spilimbergo (IT)

(73) Assignee: CASTLE COMMERCIAL ENTERPRISES LIMITED, Dublin (IE)

( * ) Notice: Subject to any disclaimer, the term of this patent is extended or adjusted under 35 U.S.C. 154(b) by 266 days.

(21) Appl. No.: 15/768,730

(22) PCT Filed: Nov. 10, 2016

(86) PCT No.: PCT/IB2016/056763
§ 371 (c)(1),
(2) Date: Apr. 16, 2018

(87) PCT Pub. No.: WO2017/085596
PCT Pub. Date: May 26, 2017

(65) Prior Publication Data
US 2018/0298313 A1 Oct. 18, 2018

(30) Foreign Application Priority Data

Nov. 17, 2015 (IT) .................... 102015000073366

(51) Int. Cl.
*C12G 1/032* (2006.01)
(52) U.S. Cl.
CPC .................. *C12G 1/0216* (2013.01)

(58) Field of Classification Search
CPC .................................................. C12G 1/0216
See application file for complete search history.

(56) References Cited

U.S. PATENT DOCUMENTS

| 6,125,736 A | 10/2000 | Marin |
| 2007/0196535 A1 | 8/2007 | Francia |
| 2008/0175951 A1 | 7/2008 | Rule |
| 2013/0199376 A1 | 8/2013 | Rule |

FOREIGN PATENT DOCUMENTS

| CH | 622821 A5 | 4/1981 |
| EP | 1067177 A1 | 1/2001 |
| EP | 1964914 A1 | 9/2008 |
| EP | 2060623 A1 | 5/2009 |
| EP | 2806019 A1 | 11/2014 |
| WO | 9845403 A1 | 10/1998 |

*Primary Examiner* — Ryan J. Walters
(74) *Attorney, Agent, or Firm* — Pearne & Gordon LLP

(57) ABSTRACT

A fermenter for fermenting a solution, comprising: a vat (2) predisposed for containing a solution (3) to be fermented, and provided with an inlet opening (4, 33) and an outlet opening (5, 25); a pumping-over conduit (100) provided with a first connection (101), which is placed in communication with a lower zone of the vat (2), and a dispensing opening (103), disposed in an upper zone of the vat (2) so as to be capable of dispensing a liquid above the upper level of the solution (3). The pumping-over conduit (100) comprises a second connection (102), disposed in an intermediate position between the first connection (101) and the dispensing opening (103), which dispensing opening (103) is so arranged as to allow the gas to be introduced into the pumping-over conduit (100).

20 Claims, 9 Drawing Sheets

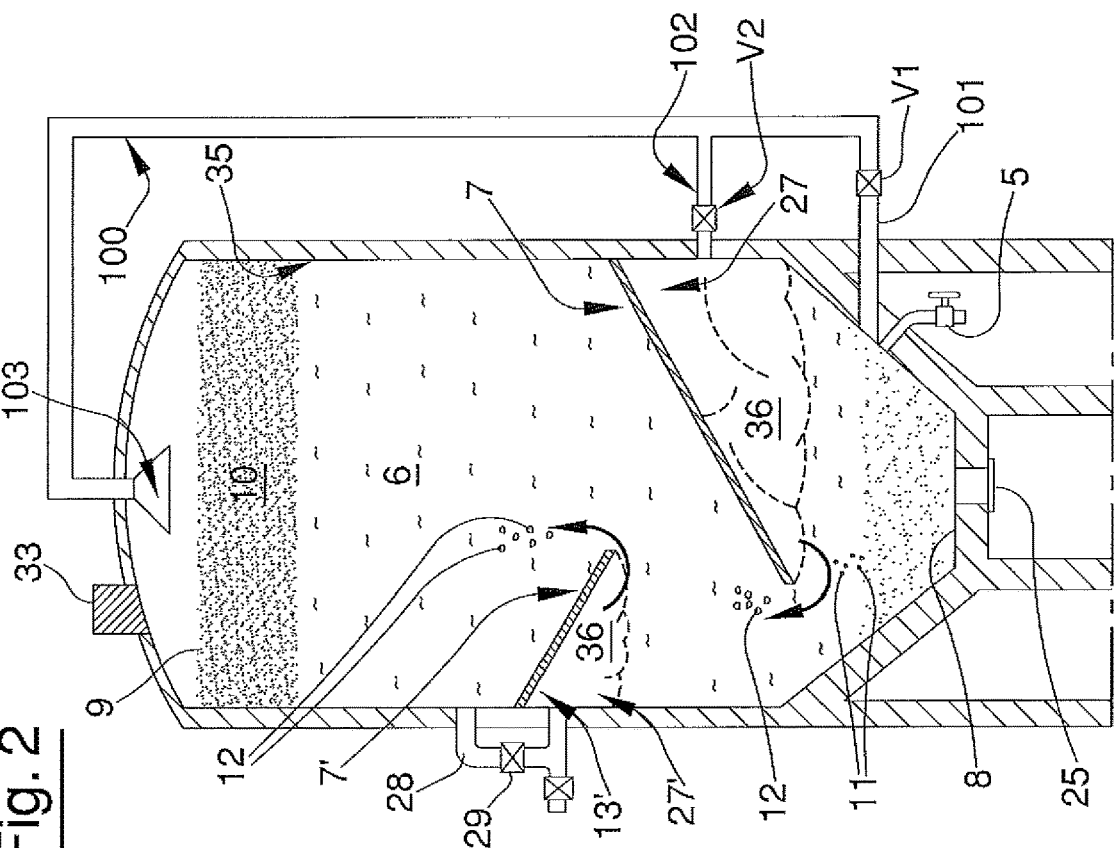
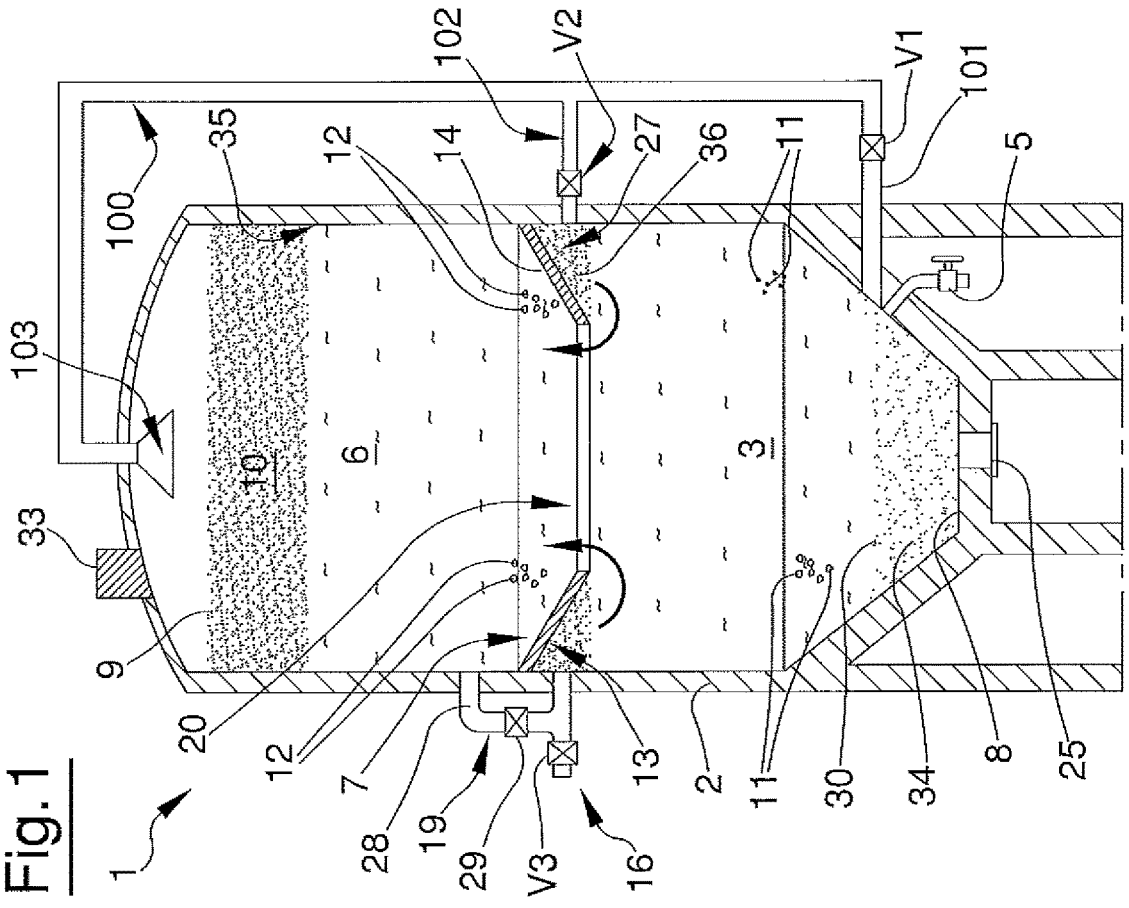

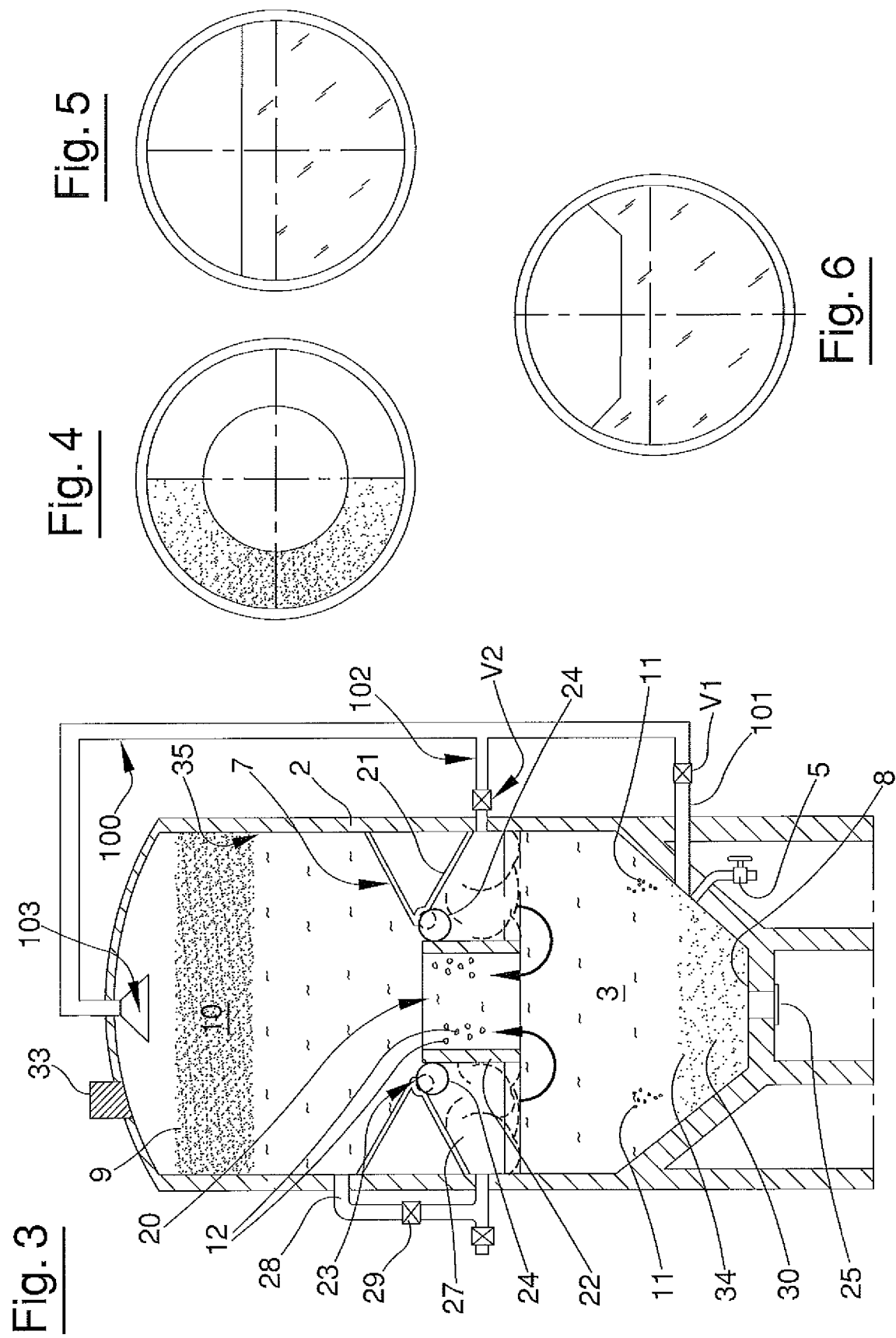

FERMENTER

The present invention relates to an improved fermenter, used in particular in the wine industry for vinification of musts, and also useful on closed tanks, i.e. pressurised, such as autoclaves.

The prior art includes very many types of fermenters, which all substantially comprise at lease a recipient, or vat, with various types of bottoms, often an inverted truncated cone, provided with an opening for introduction of liquid to be fermented and a tap for discharging the fermented liquid.

The liquid to be fermented is, in the case of vinification, i.e. the production of wine from crushed grapes, made up of wine juice and also marc, i.e. by the whole of the solid parts of the grapes constituted by skins, grape seeds (seeds present in the grapes), and also possibly by stalks. The fermented liquid is more properly termed fermented must or wine.

During the process of fermentation, in the upper part of the vat a solid floating layer is formed, known as the cap, constituted by various layers of marc, a topmost of which layers usually is slightly raised on the top of the liquid. This is a particularly compact mass which it is appropriate to break so as to prevent, on completion of the fermentation, its becoming excessively solid, but also so as to exploit its characteristics during the course of maceration of the fermenting liquid.

The skins, for example, contain substances that colour the wine, and this characteristic assumes relevance in particular for grapes that yield the extractive colorant substances with less readiness, such as for example Sangiovese grapes. To achieve a correct use of the cap it is therefore important for it not to be left simply to float on the liquid to be fermented but for it indeed to be used so as to improve the quality of the wine.

For this purpose fermentation recipients are known which enable carrying out, during the course of alcoholic fermentation, a complete and calibrated movement of the marc so as to improve its yielding of colorant and polyphenolic substances.

Often the techniques used at present are expensive and complex and the action thereof on the cap of must is aggressive and leads to a formation of an undesired quantity of dregs.

One of the habitually-used techniques includes a pumping-over which is operated using various devices whose ultimate purpose is to sprinkle the must contained in the vat onto the cap, in the form of a shower.

However, this solution also requires, for its application, a presence of pumps and piping that make it expensive and subject to halts in operations due to possible failure or malfunctioning. Further the pumps lead, in the case of dragging grape seeds and skins, to an increase in the presence of dregs, which facilitates irreversible dissolving of substances characterised by astringent properties and bitter flavours in the wine.

It is in fact known to act on the cap using pneumatic pistons so as to immerse the cap in the must-wine, even only partially, in order to break it and reduce its solidity. This operation, known as punching down, is repeated two or three times a day and requires special attention as each punching-down causes lacerations in the marc and thus increases the formation of dregs.

There also exists a punching-down by injection of only compressed air using lances or the like, for moving and stirring the cap. When this operation is done manually it is necessary for the personnel to be instructed in advance so that the operation is carried out at a predetermined velocity. Excessive injection of air would cause significant alcohol loss, or in some cases, would facilitate an acetic acid fermentation that would transform the wine into vinegar. Contrarily, the injection of too-little air would uselessly slow down fermentation.

Considering that a vat can contain up to 3.000-4.000 hl., it is easy to understand the importance and delicacy of these operations. A possible error in evaluation during the punching-down might lead to the loss of a significant quantity of wine.

All the known-type solutions illustrated in the foregoing have in common the fact that they act mechanically on the cap, mostly after the cap has already been formed and has reached a certain degree of solidity. Further, the mechanical action on the cap facilitates the breaking-up of the marc and causes an undesired increase in the quantity of dregs produced. As is known, the dregs can be the cause of undesired flavours and can require further operations for the following cleaning of the wine.

Alternatively to the use of compressed air, inert gases have also been used such as nitrogen, carbon dioxide and the like. These solutions include the injection of pressurised gas (normally from 3 to 7 bar) from the bottom or the walls of the tank, through two or more conduits with the purpose of striking the floating cap on the surface, and attempting to inundate it and break it up.

The aim of the present invention is to obviate the above-described drawbacks manifested by the known-type devices by providing a fermenter which does not require motorised mechanical devices for moving the marc.

A further aim is to improve the exploitation of the marc while at the same time reducing the number of operations otherwise requested for it.

Further, an aim of the present invention is to reduce the number of mechanical devices present in the fermenters, so as to reduce the costs both of realisation and management thereof. In this way it is possible further to reduce the number of failures that can occur during the fermentation steps.

Lastly, a further aim is to make the fermenter easier to use.

Further characteristics and advantages of the present invention will become more apparent in the following detailed description of an embodiment of the invention at hand, illustrated by way of non-limiting example in the attached figures, in which:

FIG. 1 is a schematic view of a fermenter according to the present invention;

FIG. 2 illustrates a constructional variant of the membrane of FIG. 1;

FIG. 3 illustrates a further variant of the membrane of FIG. 1;

FIG. 4 illustrates a simplified view from above of the membrane of FIG. 1;

FIGS. 5 and 6 are a simplified view from above of two different embodiments of the membranes of FIG. 2;

Figure 7:
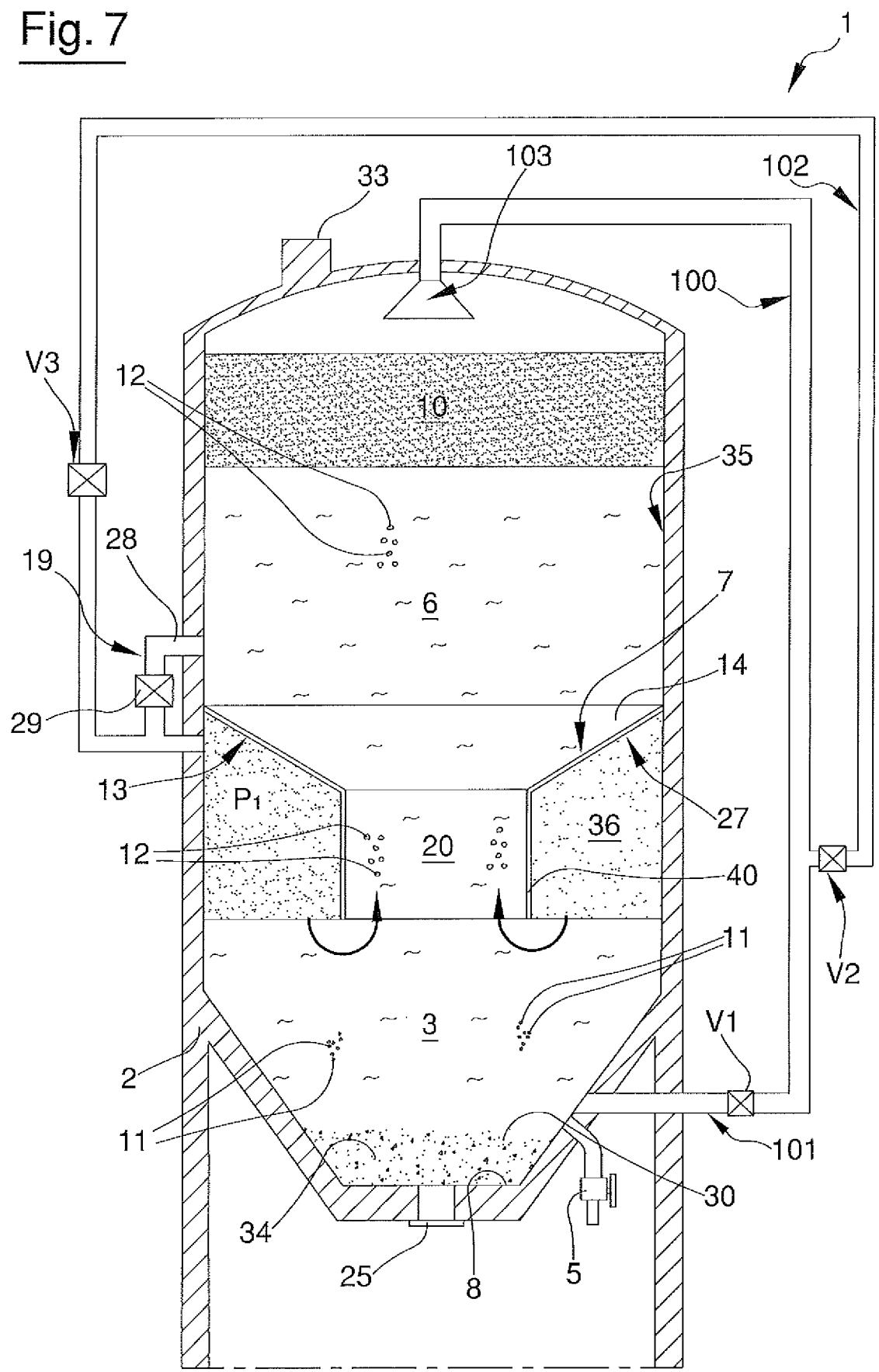
FIG. 7 shows a variant embodiment of the fermenter.

With particular reference to appended FIG. 1, reference numeral 1 denotes a fermenter in its entirety.

The fermenter 1 comprises in particular a vat 2 provided with a bottom 8 in which the solution 3 to be fermented is contained, constituted in the example illustrated herein by wine, wine must, marc and any chemical additives, yeasts or the like. The vat 2 further exhibits an opening for introducing the solution 3 to be fermented, i.e. crushed grapes, and an opening 5 for collecting the fermented solution 6, i.e. wine. For example, the introduction of the crushed grapes can be done through an opening (33) located at the top of the vat 2.

The vat 2 can be provided with a upturned truncated cone bottom for facilitating extraction, on completion of fermentation, of solid residues, i.e. the dregs 30, of the marc and grape seeds 34 An outlet opening 25 is therefore located at the bottom 8, by means of which it is possible to access the bottom 8 not only for the removal of the dregs 30 and the marc but if required also for facilitating access internally of the vat 2 for the operations of maintenance and cleaning.

Figure 11:
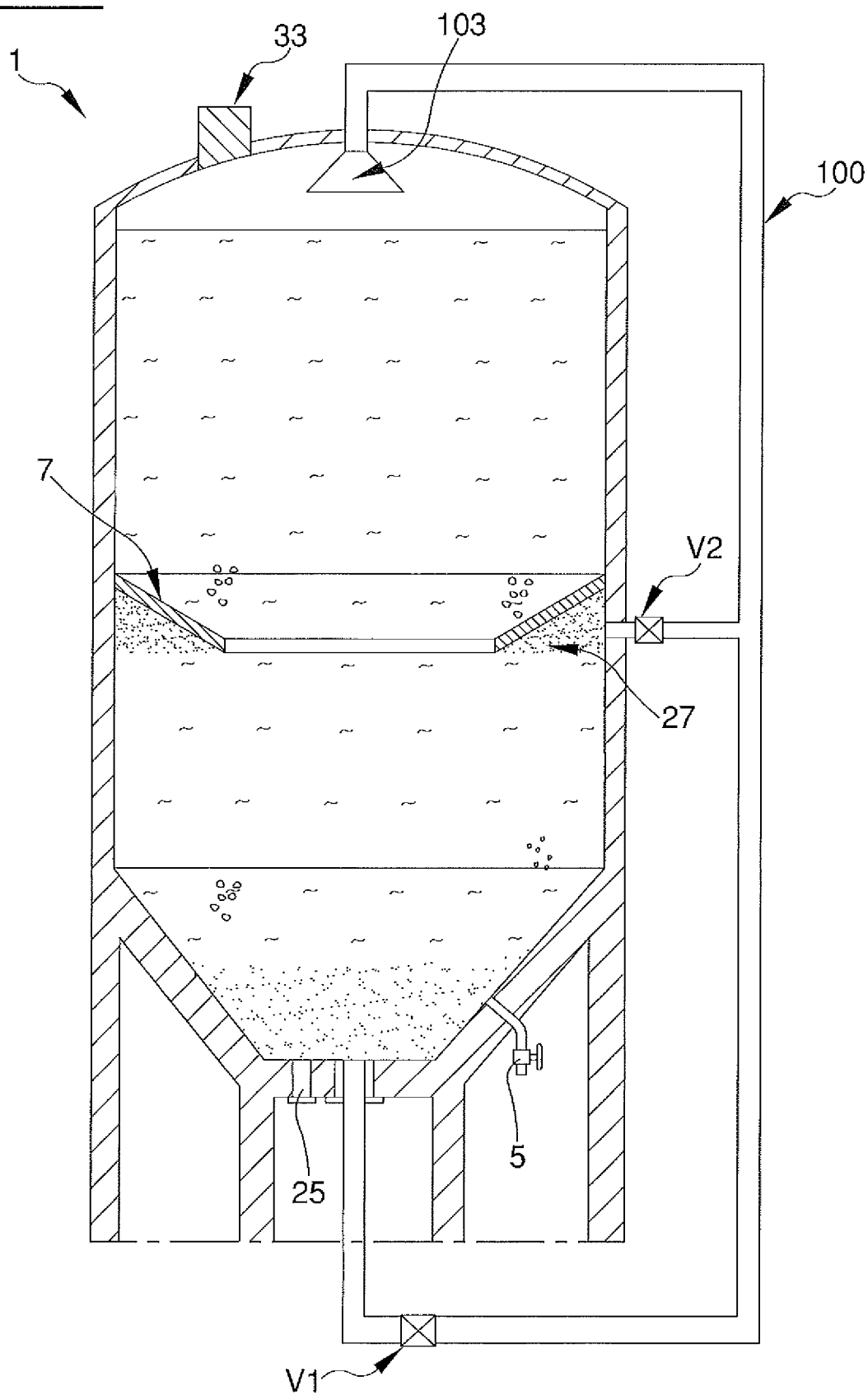
FIGS. 11 and 13 illustrate two variant embodiments of the invention, applied to closed tanks.

In an alternative embodiment, illustrated in FIG. 11, the vat 2 might be a closed tank, for example an autoclave of the type that can be used for production of fizzy and sparkling wine. As is known, an internal pressure is determined in the vats, determined by the development of fermentation gases. In the production of fizzy and sparkling wines the cap 10 of marc might not be present. In the production of red wines the cap 10 is, on the other hand, present.

Figure 13:
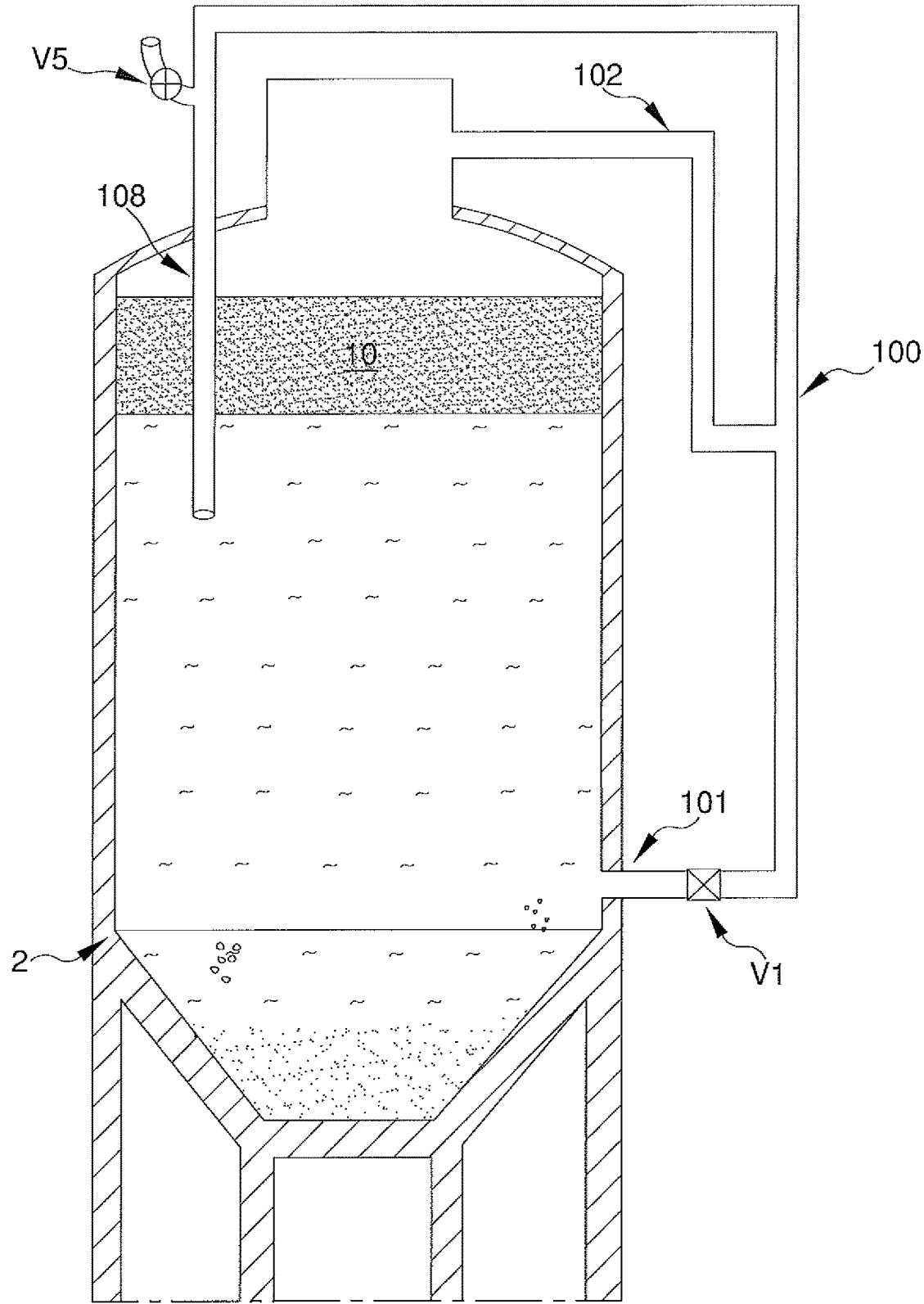

In an alternative embodiment, illustrated in FIG. 13, the vat 2 might still be a closed tank, and therefore characterised by the presence of an internal pressure determined by the development of fermentation gas, in which the accumulation means 7 are constituted by the vat 2.

The fermenter further comprises a pumping-over conduit 100, provided with a dispenser 103 substantially located at the top 33 of the vat 2 in such a way as to be able to spray with liquid the cap of marc 10 which forms on the liquid surface of the fermenting solution 6. The pumping-over conduit 100 is placed in communication with the bottom zone of the vat 2, by means of a first connection 101. Alternatively the pumping-over conduit 100 might be located internally of the vat 2 with a lower end thereof arranged in the bottom zone of the vat 2. In both cases the first connection 101, which in the case of the internal pumping-over conduit 100, is constituted by the lower end of the conduit 100, can be provided with a control valve V1 for controlling opening and closing thereof.

In both embodiments the pumping-over conduit 100 is filled with solution, in particular the solution 3 present in the bottom zone of the vat 2, up to a level that substantially coincides with the level of liquid internally of the vat 2, including the height of the cap 10. In other terms the pumping-over conduit 100 fills with solution up to the level reached by the cap 10, by virtue of the communicating vessels principle.

The pumping-over conduit 100 is advantageously provided with a second connection 102, having variable shape and dimensions, located between the first connection 101 and the dispenser 103. The second connection 102 is predisposed for enabling introduction of a gas internally of the pumping-over conduit 100. The introduced gas has a lower specific weight with respect to that of the solution contained in the pumping-over conduit 100 at the second connection 102, and this determines a vigorous thrust in an upwards direction of the column of solution overlying the conjoining point between the pumping-over conduit 100 and the connection tube 102, so that the solution exits the dispenser 103 and sprays the cap 10. The second connection 102 too can be provided with a control valve V2, predisposed for controlling the opening and closing thereof.

The fermenter provided with the pumping-over conduit 100 structured as described in the foregoing therefore enables carrying out the re-mounting of the solution to be fermented without the aid of pumps or other mechanical organs. In this way the general costs are reduced and there is no need to subject the solution to be fermented to mechanical actions that might cause it to deteriorate and might compromise the quality thereof.

In a particularly advantageous embodiment the vat 2 is internally provided with a membrane 7 for accumulation of fermentation gas which extends from the walls 35 towards the inside of the vat 2 and which is solidly constrained to the internal walls 35 of the vat 2. The membrane 7 is conformed in such a way as to form, between the walls 35 of the vat 2 and the lower part of the membrane 7, a concave surface able to trap the small bubbles of gas 11.

In the example illustrated in FIG. 1, the surface is a truncated cone-shaped inverted inclined surface 14 in the form of a truncated cone, the external edge 26 of which is solidly constrained to the internal surface of the circular vat 2.

Obviously, if it is desired to apply the membrane to vats having a non-circular transversal section, for example square, the membrane will have to exhibit a surface suitable for the aim, i.e. a truncated pyramid shape.

Therefore an opening 20 remains open in the central zone of the vat 2, which opening 20 is not involved by the membrane 7. The small gas bubbles 11 can rise through this opening 20 without being intercepted by the gas accumulation membrane 7.

The small bubbles of gas 11 which rise along the perimeter area of the vat 2 are intercepted by a chamber 27 that is open in a downwards direction, formed by the concave surface afforded between the lateral walls of the vat 2 and the lower surface of the membrane 7. The small bubbles of gas 11, by accumulating in the chamber 27, slowly saturate the free volume up to forming one or more large bubbles 36 which then unite one by one to form larger bubbles 12 generated by the bubble 36 which, after having grown beyond the free dimensions of the chamber 27, overruns from the internal edges in the zone of the opening 20.

In this way the small bubbles of gas 11 form, as they rise towards the surface, bubbles 12 of larger dimensions able to continuously move a cap 10 formed by the marc contained in the vat 2. The cap 10 is then continuously aerated from below (by the carbon dioxide of the bubbles 12) and the lower part thereof, in contact with the surface of the must-wine 6, is stirred and newly immersed in the must-wine 6, facilitating the yielding-up of substances, including colorants, contained in the cap 10. This yielding involves the whole surface of the cap 10 as its continuous stirring prevents solidification thereof.

As the cap 10 does not normally reach the state of solidification, its removal, on completion of fermentation, can also be carried out simply by acting from the outlet opening 25, in the same way as for the dregs 30 and the grape seeds 34.

With the action of the large bubbles 12 during the rising thereof in the must-wine 6, stirring of the fermenting liquid 3 is also facilitated.

In this embodiment the second connection 102 of the pumping-over conduit 100 opens below the membrane 7, substantially in the chamber 27. In this way it is the gas, produced by the fermentation and trapped in the chamber 27, which thrusts the column of liquid present upwards above the second connection 102 in the pumping-over conduit 100. The start and stop of the pumping-over can be determined through the opening and the closing of the control valve V2. The presence of the membrane 7 thus enables carrying out the pumping-over without any need to use external gases; in this way a further costs saving is made and the natural energy represented by the carbon dioxide generated during the alcoholic fermentation can be exploited.

In the case of a closed tank in the embodiment of FIG. 11, the use of the accumulated gas for carrying out the pumping-over facilitates the dragging of the yeasts, which by force of gravity tend to settle on the bottom, returning them to the upper part of the tank and making the use of mechanical stirrers no longer necessary. Further, the homogenisation of the product and the temperature thereof are facilitated.

Alternatively the accumulated gas might be temporarily stocked in appropriate volumes or storage areas external of the fermenter. In this case the second connection 102 would be in communication with the external storage volumes external of the fermenter.

The fermenter can further be provided with a bypass conduit 28 which places the chamber 27 in communication with the part of the vat 2 that is above the membrane 7. This conduit 28, which can be provided with a commandable closing valve 29, can be used for sending the gas to the cap 10 zone overlying the membrane 7, facilitating the stirring thereof.

In a possible further embodiment of the fermenter, illustrated in FIG. 7, the second connection 102 of the pumping-over conduit 100 is in communication with the bypass conduit 28

In order to possibly influence the fermentation from outside, it is possible to inject external gases, or the internal gases that have been stored in the external accumulation volumes, into the fermenter. The injection of the gases from the outside can be controlled by means of a control valve V3. The control valve V3, for example, can be connected to the bypass conduit 28 or to the second connection 102.

Via the bypass conduit 28 or the second connection 102 and/or taps 16 or other like conduits, it is also possible to place in communication two or more fermenters between them in order to exploit, for example, the gas ($CO_2$) produced in excess in one of them in order to supply others. This operation has the great advantage of not introducing air into the vats to move the cap; in fact, the air can influence not only the formation of the cap but also the oxidation of the must.

FIG. 2 illustrates a constructional variant of the membrane 7. Two membranes 7 and 7' are comprised therein, arranged in cascade i.e. in such a way that the large-dimension bubbles 12 produced by the lower membrane 7 supply the overlying membrane 7'. In this way it is possible to improve the effect of bubble generation internally of large vats 2. In this case the second connection 102 of the pumping-over conduit 100 can be connected to the chamber 27 defined below one of the membranes 7,7'.

The membrane applied to the fermenter of FIG. 1 is well visible in FIG. 4; the membranes applied to the fermenter of FIG. 2 are clearly visible in FIGS. 5 and 6. In substance the membranes have a semi-circular or half-moon shape, possibly bevelled or cut in some parts thereof.

FIG. 3 illustrates a further constructional variant of the membrane 7. It comprises a truncated cone-shaped peripheral zone 21 delimited centrally by a cylindrical zone 22. A controllable annular opening 23 is included between the two surfaces, comprising an inflatable toroid 24.

By modifying the inflation pressure of the toroid 24 it is possible to act on the dimension of the opening 23 in a very simple and economical way. In this embodiment too, the second connection 102 of the pumping-over conduit 100 opens in the chamber 27 defined below the membrane 7.

Obviously it is also possible to apply to the opening 20 of the embodiment of FIG. 1 an appropriate device (not illustrated) able to vary the dimension of the opening 20 according to needs. This device (not illustrated) might, for example in the example of FIG. 1, prolong the truncated cone surface in the direction of the imaginary vertex thereof, i.e. increasing the volume of gas collected in the chamber 27 or it might, more simply, exclusively vary the section of the opening without increasing the volume of the chamber 27. In this second case, therefore, it would be a device that would extend horizontally either upwards, thanks to which, apart from varying the dimension of the zone of influence of the large bubbles 12 on the cap 10, the step of generating the larger bubbles 12 can be varied so as to be able to influence the dimension thereof during use.

The illustrated solution thus enables preventing or at least limiting the formation of a solid cap and further enables continuously stirring the cap with the fermenting must-wine and facilitating extraction of the marc, the marc not being compacted on completion of the fermentation cycle.

Figure 8:
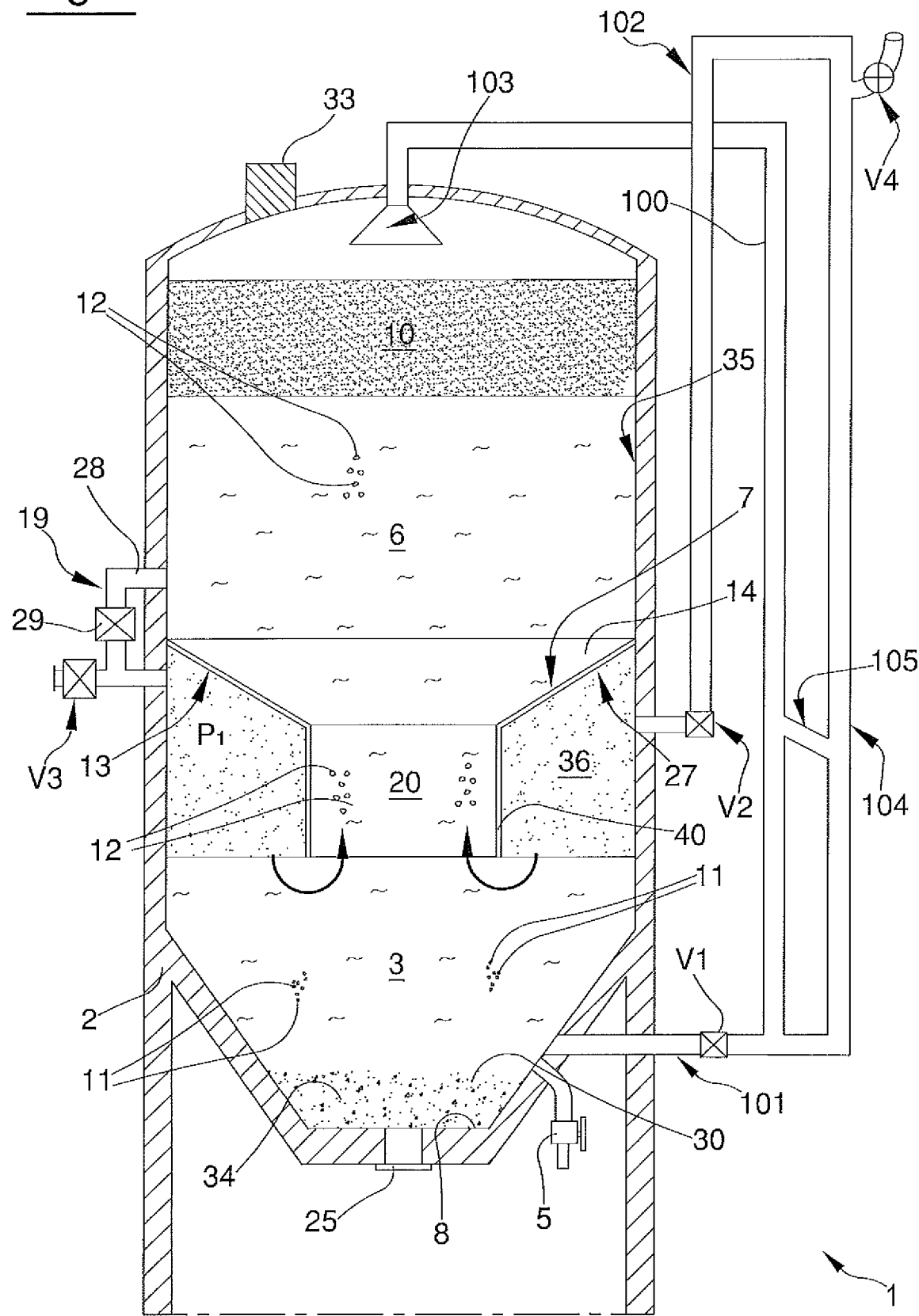
FIGS. 8, 9 and 10 illustrate further variant embodiments of the fermenter.
Figure 9:
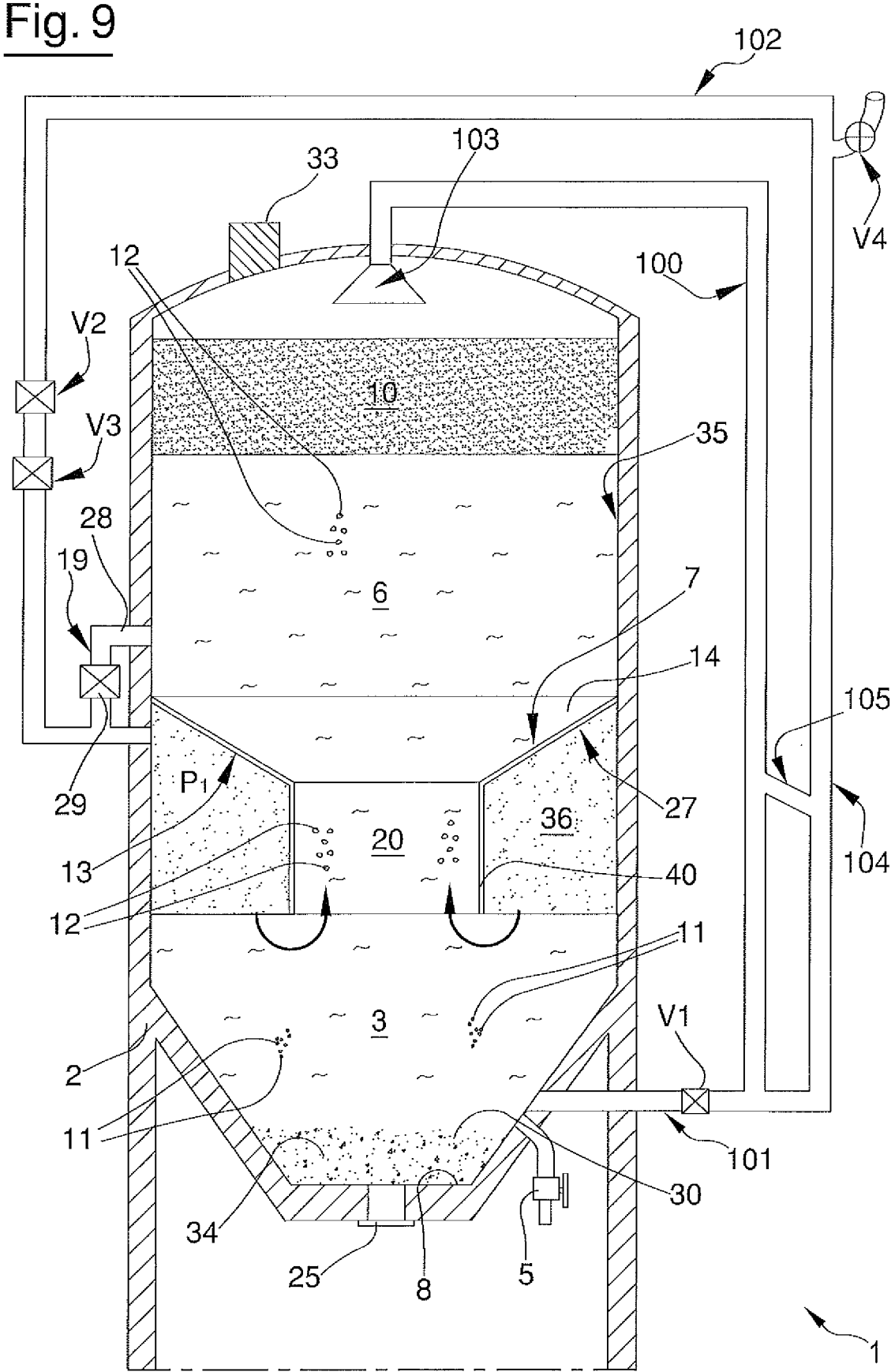

In two further possible embodiments of the fermenter, illustrated in FIG. 8 and FIG. 9, the second connection 102 of the pumping-over conduit 100 is placed in communication, apart from with the stretch comprised between the first connection 101 and the dispenser 103, also with the first connection 101. As illustrated in FIG. 8 and in FIG. 9, the second connection 102 has at least an auxiliary stretch 104 parallel to the pumping-over conduit 100. The auxiliary stretch 104 fills with liquid in a like way to the pumping-over conduit. The auxiliary stretch 104 is connected inferiorly to the first connection 101 and, in an intermediate zone, to the pumping-over conduit 100 through an intermediate fitting 105. The auxiliary stretch 104 can be provided in an upper zone of the by-pass valve V4 which allows venting of the additional tube 104. The eventual injection of external gas through the injection valve V3 and with the valve V2 open, thrusts the liquid present in the auxiliary stretch 104 downwards as far as the intermediate fitting 105. Having reached the intermediate fitting 105, the gas thrusts the liquid towards the upper part of the pumping-over conduit 100 up to the dispenser 103. The embodiments illustrated in FIG. 8 and FIG. 9 enable injecting an external gas into the pumping-over conduit, preventing the gas from mixing with the product, carrying out an injection of gas in an intermittent manner, i.e. closing the valve V2 at predetermined time intervals.

Figure 10:
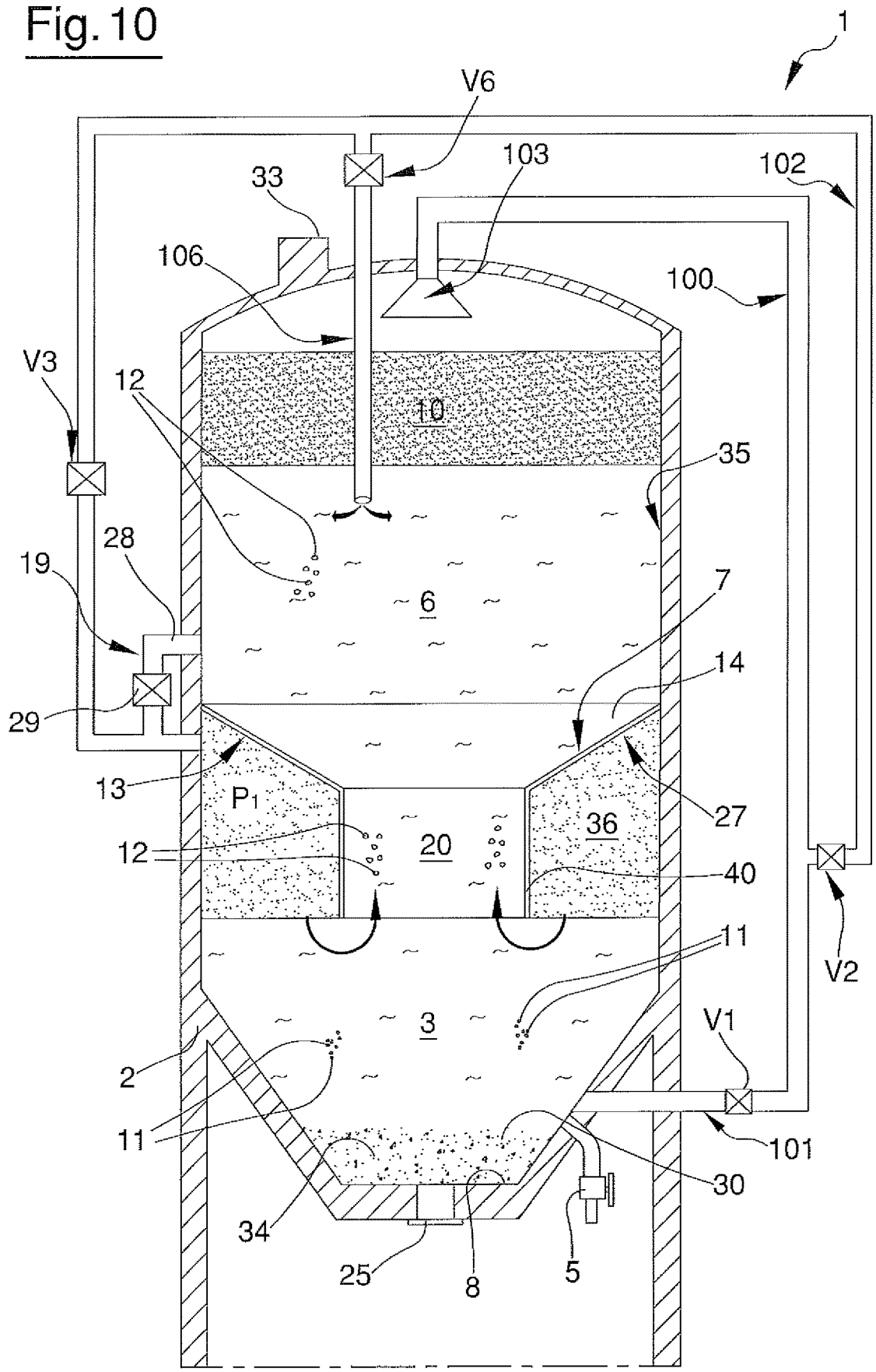

FIG. 10 illustrates an additional solution that can be adopted on the solution of FIG. 7 (but can be applied also to FIG. 1, 2 or 3) where an optional auxiliary conduit 106 is added to the conduit 102, provided with a control valve V6 which enables, on opening the valve, discharging part or all of the gas accumulated below the membrane just below the cap 10.

Figure 12:
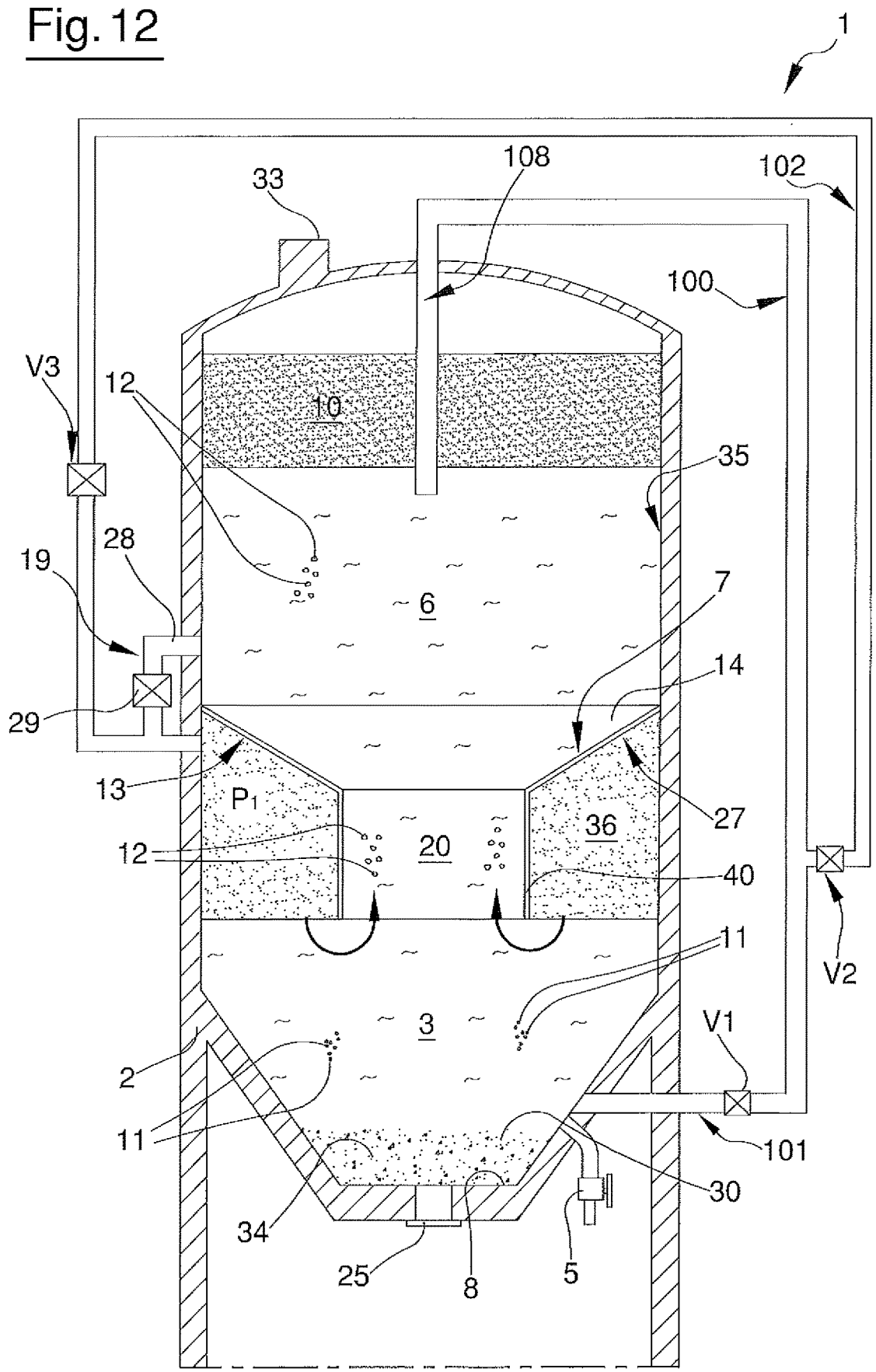
FIG. 12 shows a further variant embodiment of the fermenter.

FIG. 12 illustrates a variant embodiment in which the dispenser 103 is arranged inside or below the zone normally occupied by the cap 10, so as to dispense the liquid within or below the cap 10. The dispenser 103 can be conformed as a conduit 108 which partially or totally crosses the cap 10 of marc and dispenses the solution internally of or below the cap 10 of marc.

FIG. 13 shows a variant embodiment of the fermenter, in which the vat 2 is substantially a closed tank which also functions as accumulation means 7 of the fermentation gas. In this embodiment the dispenser 103 can be conformed as a dispensing conduit 108 which partially or totally crosses the cap 10 of marc and dispenses the solution internally of or below the cap 10 of marc. A vent valve V5 is present in the upper zone of the conduit 108, an opening of which enables venting the gas and a consequent precipitation by gravity in the liquid which, dragged by the gas up to the vent valve V5, exits from the lower end of the conduit 108. Via the opening and closing of the vent valve V5, when the control valve V1 is open, it is possible to determine the start and stop of the pumping-over. The second connection 102 preferably opens into the pumping-over conduit 100 at a greater height than the vent of the dispensing conduit 108.

With the present invention it is thus possible to realise fermenters that are of simple but effective conception which, as well as being extremely economical if compared to fermenters of known type, do not require complex or expensive maintenance.

It is further possible to use the fermenter of the present invention, apart from for wine production, also for beer production and also for transforming other fermentable products, such as for example apples, potatoes or the like.

The invention claimed is:

1. A fermenter for fermenting a solution, comprising: a vat (2) predisposed for containing a solution (3) to be fermented, and provided with an inlet opening (4, 33) and an outlet opening (5, 25); a pumping-over conduit (100) provided with a first connection (101), which is placed in communication with a lower zone of the vat (2), and a dispensing opening (103), disposed in an upper zone of the vat (2) so as to be capable of delivering a liquid above the upper level of the solution (3); characterized in that the pumping-over conduit (100) comprises a second connection (102), disposed in an intermediate position between the first connection (101) and the dispensing opening (103), which dispensing opening (103) is so arranged as to allow a gas to be introduced into the pumping-over conduit (100), the fermenter further comprising accumulation means (7), which are structured so as to intercept and temporarily accumulate the gas (11) generated by fermentation, in which the second connection (102) of the pumping-over conduit (100) is in communication with the gas intercepted by the accumulation means (7).

2. A fermenter according to claim 1, wherein the second connection (102) is provided with a control valve (V2).

3. A fermenter according to claim 1, wherein the accumulation means (7) comprises at least one concave surface (13), the concavity of which is facing downwards, so as to define a chamber (27) suitable to trap the gas generated by the fermentation, in which the second connection (102) of the pumping-over conduit (100) is in communication with the gas accumulation chamber (27).

4. A fermenter according to claim 3, wherein the chamber (27) is connected with the outside of the vat (2) by means of first connection means (16), which may be controlled so as to allow introduction or extraction of gas.

5. A fermenter according to claim 3, comprising second connecting means (19), predisposed for connecting the chamber (27) to the part of the vat (2) disposed above the concave surface (13).

6. A fermenter according to claim 3, in which the gas accumulated by the accumulation means (7) can be temporarily accumulated within a volume internal or external to the tank.

7. A fermenter according to claim 3, wherein the concave surface (13) comprises an inclined surface (14) fixed to an inner wall (35) of the vat (2).

8. A fermenter according to claim 3, wherein the concave surface (13) comprises a truncated-cone surface (14) fixed to an inner wall (35) of the vat (2).

9. A fermenter according to claim 3, wherein the concave surface (13) converges centrally into a tube (40) which extends downwards.

10. A fermenter according to claim 3, wherein the concave surface (13) comprises closing means which are so structured as to vary the width of an opening (20) of the vat (2) not occupied by the concave surface (13).

11. A fermenter according to claim 3, wherein the concave surface (13) comprises a truncated-cone peripheral element (21) having a vertex facing downwards and delimited centrally by a cylindrical element (22), and wherein a controllable annular opening (23) is disposed between the peripheral element (21) and the cylindrical element (22).

12. A fermenter according to claim 11, wherein the annular opening (23) comprises an inflatable toroid (24) to change the width thereof.

13. A fermenter according to claim 3, wherein the dispensing opening (103) is arranged inside or below the zone occupied by a cap (10), so as to dispense the liquid within or below the cap (10).

14. A fermenter according to claim 1, wherein the second connection (102) of the pumping-over conduit (100) has at least one auxiliary stretch (104) connected to the first connection (101) and, in an intermediate zone, to the pumping-over conduit (100) through an intermediate fitting (105).

15. A fermenter according to claim 14, wherein the second connection (102) of the pumping-over conduit (100) is connected to the bypass conduit (28).

16. A fermenter according to claim 14, wherein the auxiliary stretch (104) is provided in an upper zone of a by-pass valve (V4) which allows venting of the auxiliary stretch (104).

17. A fermenter according to claim 1, wherein the dispensing opening (103) is arranged inside or below the zone occupied by a cap (10), so as to dispense the liquid within or below the cap (10).

18. A fermenter according to claim 1, comprising an auxiliary conduit (106), in communication with the second connection (102), which auxiliary conduit (106) is arranged with its own outlet below the zone occupied by a cap (10) and provided with a control valve (106), said auxiliary conduit (106) being predisposed for allowing the gas to be discharged below the cap (10).

19. A fermenter according to claim 1, wherein the dispensing opening (103) comprises a conduit (108) which flows within or below the zone occupied by a cap (10).

20. A fermenter according to claim 19, wherein the conduit (108) comprises a vent valve (V5) the opening of which allows venting of the gas and the consequent precipitation by gravity of the liquid contained in the conduit (108).

* * * * *